(12) United States Patent
Katsuhito et al.

(10) Patent No.: US 7,307,616 B2
(45) Date of Patent: Dec. 11, 2007

(54) SENSOR FOR COORDINATE INPUT DEVICE

(75) Inventors: Obl Katsuhito, Saitama-ken (JP);
Toshihiko Horie, Saitama-ken (JP);
Koborl Takeshi, Ibaraki-ken (JP)

(73) Assignee: Wacom Co., Ltd., Saitama-ken (JP)

( * ) Notice: Subject to any disclaimer, the term of this patent is extended or adjusted under 35 U.S.C. 154(b) by 559 days.

(21) Appl. No.: 10/995,547

(22) Filed: Nov. 24, 2004

(65) Prior Publication Data

US 2005/0134260 A1    Jun. 23, 2005

(30) Foreign Application Priority Data

Nov. 28, 2003   (JP)   ............................. 2003-400370

(51) Int. Cl.
*G09G 5/00* (2006.01)

(52) U.S. Cl. .................... 345/156; 345/173; 178/18.07

(58) Field of Classification Search ................ 345/156, 345/173, 179; 178/18.07, 18.08
See application file for complete search history.

(56) References Cited

U.S. PATENT DOCUMENTS 4,948,926 A * 8/1990 Murakami et al. ....... 178/18.07
5,635,684 A * 6/1997 Fukuzaki ................. 178/18.07
5,657,011 A * 8/1997 Komatsu et al. ............... 341/5
6,667,740 B2 * 12/2003 Ely et al. ..................... 345/179

* cited by examiner

*Primary Examiner*—Jimmy H. Nguyen
(74) *Attorney, Agent, or Firm*—Berenato, White & Stavish, LLC

(57) ABSTRACT

A sensor for a coordinate input device includes an x-direction loop coil group including a plurality of loop coils arranged in an x direction, each loop coil having at least two linear sections perpendicular to the x direction, and a y-direction loop coil group including a plurality of loop coils arranged in a y direction, each loop coil having at least two linear sections perpendicular to the y direction. A terminal portion including a plurality of terminals is provided in the vicinity of an edge portion of the x-direction or y-direction loop coil group. Lines are disposed between the linear sections of the loop coils of the x-direction loop coil group or the y-direction loop coil group to provide connections between the terminals of the terminal portion and the corresponding loop coils of the x-direction loop coil group and the y-direction loop coil group.

9 Claims, 5 Drawing Sheets

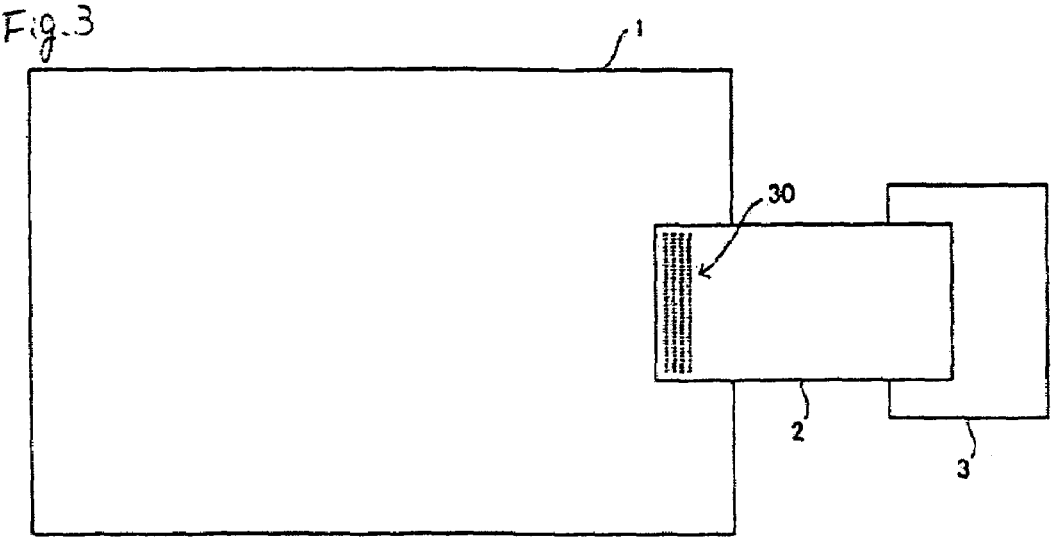
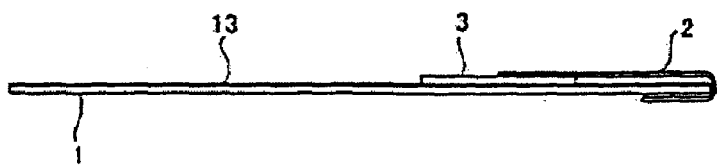
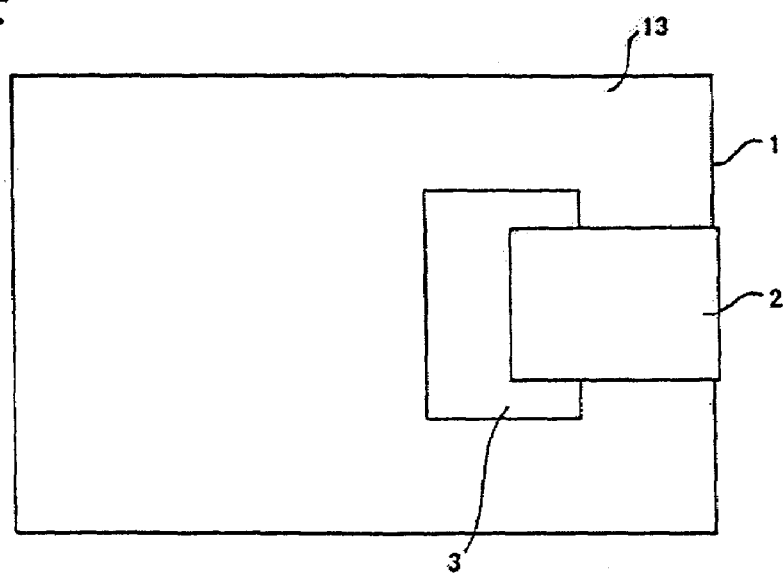

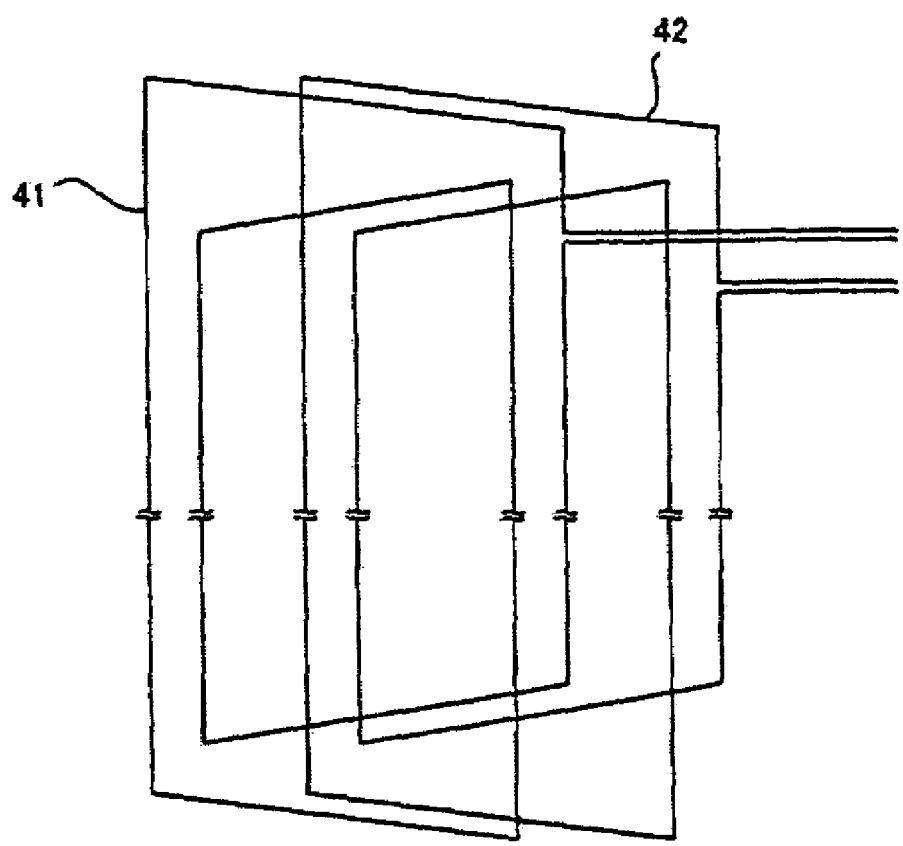

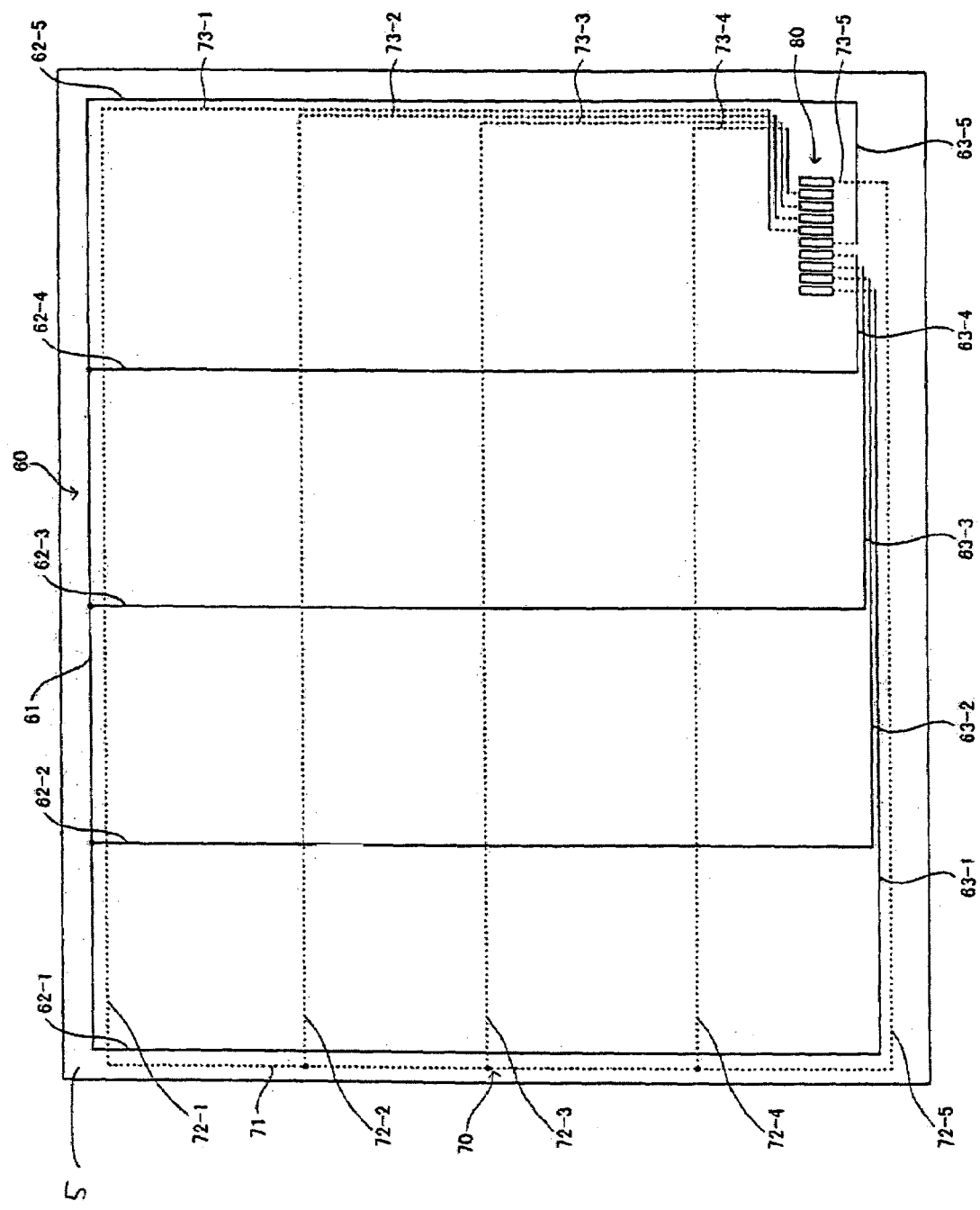

SENSOR FOR COORDINATE INPUT DEVICE

CROSS-REFERENCE TO RELATED APPLICATIONS AND CLAIM TO PRIORITY

This application claims the benefit under 35 U.S.C. § 119 of application number 2003-400370, filed Nov. 28, 2003 in Japan, the disclosure of which is incorporated herein by reference.

FIELD OF THE INVENTION

The present invention relates to a sensor for a coordinate input device using an electromagnetic effect.

BACKGROUND OF THE INVENTION

Conventional coordinate input devices are well known in the prior art. These devices use a sensor that has a large number of loop coils arranged in x and y directions and a position indicator that includes a coil. In these coordinate input devices, a sensor detects a position indicated by the position indicator using an electromagnetic effect between the sensor and the position indicator.

The sensor used by the coordinate input device must have lines for supplying power to the respective loop coils and for extracting signals from the loop coils. In conventional devices, the lines are extracted from the loop coils toward the outside of the region where the loop coils are provided and are connected to a control circuit.

The sensor for the coordinate input device has a region that can detect a position indicated by the position indicator. This region has an area where the loop coils are provided. This region is called the "detectable area". By contrast, the region where only the lines are provided and the sensor cannot detect the position indicated by the position indicator is called the "invalid area".

For the coordinate input device, increasing the detectable area that can be used for the operation of the position indicator and reducing the overall size are major challenges. To address these challenges there is a need to minimize the invalid area.

For example, Japanese Patent No. 2842717, assigned to the assignee of the present invention, discloses a technology in which the lines for supplying power to the loop coils and for extracting signals from the loop coils are arranged between wires of the loop coils and are extracted to the outside of the loop coils, thereby succeeding in reducing the invalid area.

According to the sensor disclosed in Japanese Patent 2842717, the lines are efficiently extracted toward the outside of the loop coils, so that a control circuit substrate or the like can be connected to the sensor. This makes it possible to reduce the invalid area.

However, an increase in the detectable area and a reduction in the invalid area, as described above, are still major challenges.

SUMMARY OF THE INVENTION

Accordingly, an object of the present invention is to reduce an invalid area, (which is a region that cannot detect a position indicated by a position indicator) and to increase a detectable area, (which can detect a position indicated by the position indicator) for a sensor used in a coordinate input device.

To achieve the foregoing object, the present invention provides a sensor for a coordinate input device. The sensor includes an x-direction signal detection line group that has a plurality of signal detection lines arranged in an x direction. Each signal detection line has a linear section perpendicular to the x direction. A y-direction signal detection line group includes a plurality of signal detection lines arranged in a y direction. Each signal detection line has a linear section perpendicular to the y direction. The section also includes terminal portion that has a plurality of terminals between adjacent linear sections of the x-direction signal detection line group or the y-direction signal detection line group. The linear sections of the signal line detection lines of the x-direction signal detection group and the linear sections of the signal detection lines of the y-direction signal detection line group are provided by patterns in different layers. Lines are disposed between the linear sections of the signal detection lines of the x-direction signal detection line group or the linear sections of the signal detection lines of the y-direction signal detection line group. The lines provide connections between the terminals of the terminal portion and the corresponding signal detection lines of the x-direction signal detection line group and the y-direction signal detection line group.

The present invention provides a sensor for a coordinate input device. The sensor includes an x-direction loop coil group that has a plurality of loop coils arranged in an x direction, each loop coil having at least two linear sections perpendicular to the x direction. A y-direction loop coil group includes a plurality of loop coils arranged in a y direction. Each loop coil has at least two linear sections perpendicular to the y direction. The sensor also includes a terminal portion that has a plurality of terminals between adjacent linear sections of the x-direction loop coil group or the y-direction loop coil group. The linear sections of the loop coils of the x-direction loop coil group and the linear sections of the loop coils of the y-direction loop coil group are provided by patterns in different layers. Lines are disposed between the linear sections of the loop coils of the x-direction loop coil group or the linear sections of the loop coils of the y-direction loop coil group to the lines provide connections between the terminals of the terminal portion and the corresponding loop coils of the x-direction loop coil group and the y-direction loop coil group.

In the sensor of the present invention, adjacent loop coils of the x-direction loop coil group and the y-direction loop coil group may be arranged so as to partially overlap each other.

In the sensor of the present invention, the terminal portion may be disposed between the linear sections of two adjacent loop coils of the x-direction loop coil group at an edge portion of the x-direction loop coil group or in the vicinity of the edge portion. The terminal portion may also be disposed between the linear sections of two adjacent loop coils of the y-direction loop coil group at an edge portion of the y-direction loop coil group or in the vicinity of the edge portion.

Further, in the sensor of the present invention, the terminal portion may include a plurality of terminals exposed at a surface of the sensor. A shield plate may be disposed on the reverse side of the surface on which the plurality of terminals are exposed.

In the sensor of the present invention, a flexible cable having wires for sending signals to the loop coils of the x-direction loop coil group and the y-direction loop coil group and for extracting signals from the loop coils may be connected to the terminals of the terminal portion by an anisotropic conductive film (ACF) method.

In the sensor of the present invention, the terminal portion and the loop coils of the x-direction loop coil group and the y-direction loop coil group may be provided as patterns on a rigid substrate.

According to the present invention, a terminal connected to signal detection lines as well as the lines that provide connections between the terminal and the signal detection lines can both be provided within a region where the signal detection lines are arranged. Thus, a region that the signal detection lines cannot use in the sensor to detect signals can be substantially eliminated, and substantially the entire surface of the sensor can be used as a region for detecting signals. This arrangement allows very efficient use of a space of the sensor and also can ensure a large detectable area while reducing the overall size of the sensor.

According to the present invention, a terminal connected to loop coils as well as lines that provide connections between the terminal and the loop coils can both be provided within a region where the loop coils are arranged. Thus, a region that the loop coils cannot use in the sensor to detect signals can be substantially eliminated, and substantially the entire surface of the sensor can be used as a region for detecting signals. This arrangement allows very efficient use of a space of the sensor and also can ensure a large detectable area while reducing the overall size of the sensor.

According to the sensor of the present invention, the terminal portion is disposed between the linear sections of two adjacent loop coils of the x-direction loop coil group at an edge portion of the x-direction loop coil group or in the vicinity of the edge portion. The terminal portion may also be disposed between the linear sections of two adjacent loop coils of the y-direction loop coil group at an edge portion of the y-direction loop coil group or in the vicinity of the edge portion. That is, the terminal portion is provided at a portion where adjacent linear sections are arranged at a large interval. As a result, it is possible to easily provide a terminal portion having a large number of terminals. Also, since the spacing between the adjacent liner sections at the portion where the terminal portion is disposed is large, it is possible to easily and freely arrange the lines that provide connections between the terminals of the terminal portion and the corresponding loop coils.

According to the sensor of the present invention, the terminal portion includes a plurality of terminals exposed at a surface of the sensor. A shield plate is disposed at a reverse side of the surface at which the plurality of terminals are exposed. Consequently, other wires can be easily connected to the terminals of the terminal portion. A control circuit substrate connected via those wires can be laminated and fixed to a shield plate. This arrangement can provide a sensor for a coordinate input device that allows easy connection of a control circuit or the like. The sensor can be accommodated in a small space when a control circuit or the like is connected.

According to the sensor of the present invention, a flexible cable having wires for sending signals to the loop coils of the x-direction loop coil group and the y-direction loop coil group and for extracting signals from the loop coils is connected to the terminals of the terminal portion by an anisotropic conductive film (ACF) method. This arrangement significantly facilitates the connection of other wires to the terminal portion. Thus, it is possible to provide a sensor for a coordinate input device that allows easy connection of an external circuit such as a control circuit.

According to the sensor of the present invention, the terminal portion and the loop coils of the x-direction loop coil group and the y-direction loop coil group are formed as patterns on a low-cost and high-rigidity rigid substrate such as a glass epoxy substrate. Thus, the substrate can be directly secured to a housing or the like by screwing or any manner known in the art, unlike a case in which a flexible substrate or the like is used. This arrangement can simplify the configuration of an apparatus using the sensor of the present invention and thus can reduce the failure rate, reduce the cost, and increase the design freedom of the apparatus.

BRIEF DESCRIPTION OF THE DRAWINGS

FIG. 3 is a plan view showing a structure in which a control circuit substrate 3 is connected to the sensor 1 shown in FIG. 1;

FIG. 4 is a side view showing the structure in which the control circuit substrate 3 is connected to the sensor 1 shown in FIG. 1;

FIG. 5 is a plan view showing the reverse side of the structure in which the control circuit substrate 3 is connected to the sensor 1 shown in FIG. 1;

FIG. 6 shows another example of loop coils in the embodiment of the present invention; and FIG. 7 is a view showing an example in which a comb antenna is used in the embodiment of the present invention.

DESCRIPTION OF THE PREFERRED EMBODIMENT(S)

An embodiment of the present invention will be described below with reference to the accompanying drawings.

Figure 1:
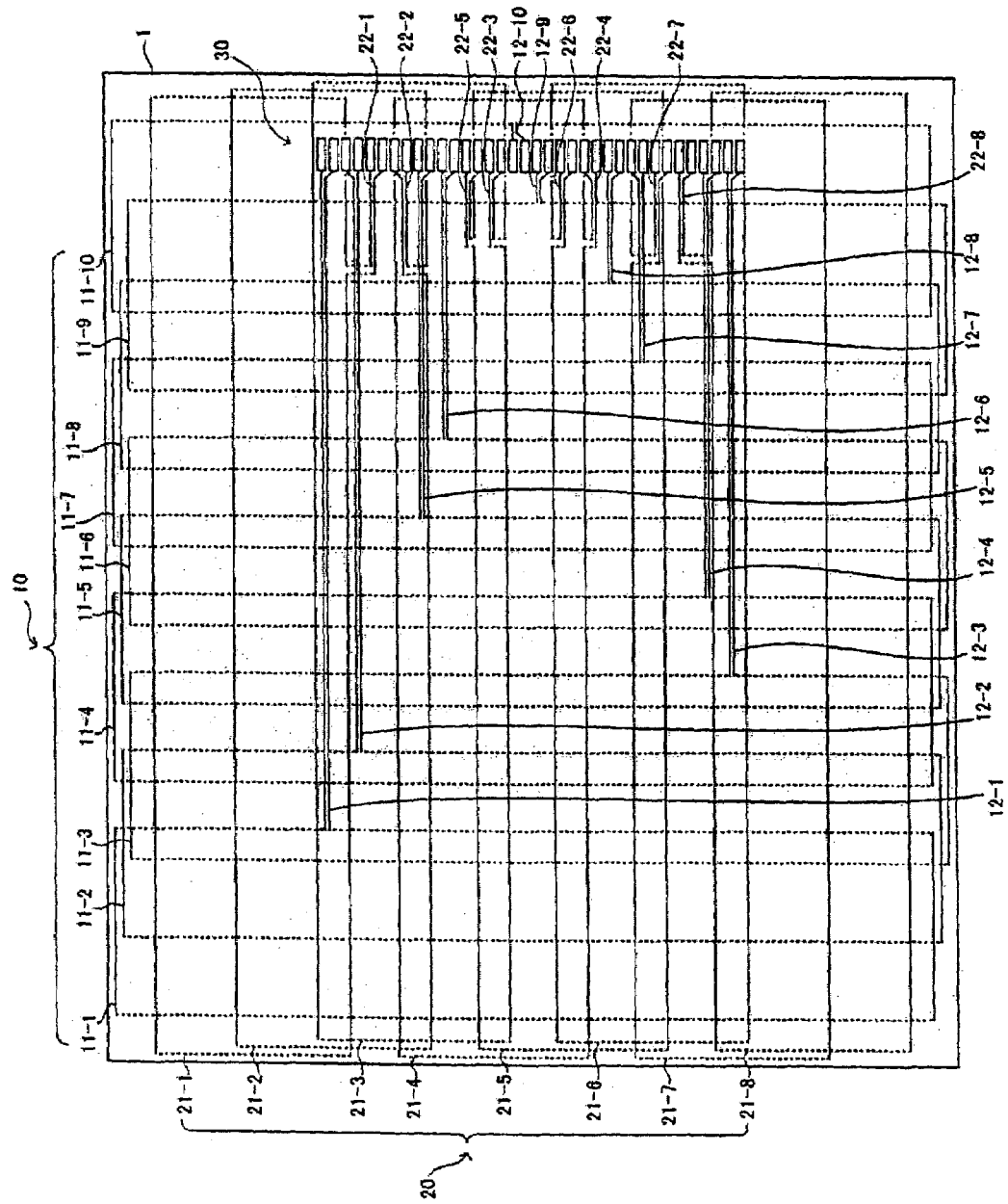
FIG. 1 is a plan view showing the configuration of a sensor 1 for a coordinate input device according to an embodiment of the present invention.

FIG. 1 is a plan view showing the configuration of a sensor 1 for a coordinate input device according to an embodiment of the present invention. In FIG. 1, reference numeral 10 indicates an x-direction loop coil group and reference numeral 20 indicates a y-direction loop coil group.

The sensor 1 includes, for example, a rigid substrate, such as a glass epoxy substrate. The solid lines and the dotted lines shown in FIG. 1 indicate wires provided on the substrate. The substrate of the sensor 1 has a plurality of layers and the wires indicated by the solid lines and dotted lines in FIG. 1 are provided by patterns in different layers. Both of the wires indicated by the solid lines and the wires indicated by the dotted lines in FIG. 1 are coated with insulating films and are not exposed at a surface of the sensor 1.

A shield plate 13 (see FIG. 4) is laminated to one surface of the sensor 1 to block electromagnetic influence. The surface to which the shield plate 13 is laminated is referred to as a "reverse" side and a surface opposite thereto is referred to as an "obverse" side.

The x-direction loop coil group 10 is constituted by loop coils each having two linear sections that are perpendicular to the x direction (i.e., the horizontal direction in FIG. 1). The y-direction loop coil group 20 is constituted by loop coils each having two linear sections that are perpendicular to the y direction (i.e., the vertical direction).

In the present embodiment, a description is given based on an assumption that the x-direction loop coil group 10 is constituted by ten loop coils 11-1 to 11-10 and the y-direction loop coil group 20 is constituted by eight loop coils 21-1 to 21-8.

For example, the loop coil 11-1 shown in FIG. 1 is comprised of two linear sections that extend in a direction perpendicular to the x direction, i.e., in the y direction, and two wires that are connected to the two linear sections and that extend in the x direction. The linear sections extending in the y direction and the wires extending in the x direction are provided by patterns in different layers and are connected via through holes (not shown). The other loop coils of the x-direction loop coil group 10 are also configured in the same manner.

Also, the loop coil 21-1 shown in FIG. 1 is constituted by two linear sections that extend in a direction perpendicular to the y direction, i.e., in the x direction, and two wires that are connected to the two linear sections and that extend in the y direction. The linear sections extending in the x direction and the wires extending in the y direction are provided by patterns in different layers and are connected via through holes (not shown). The other loop coils of the y-direction loop coil group 20 are also configured in the same manner.

With regard to the loop coils 11-1 to 11-10 of the x-direction loop coil group 10, the wires extending in the x direction do not have to be straight. With regard to the loop coils 11-1 to 11-10, it is sufficient that the linear sections in the y direction are straight at portions where the linear sections overlap the y-direction loop coil group 20. Thus, not all of the lines need to be comprised of completely straight lines and thus the lines may have a shape in which an end of each line is bent at one or more points. With regard to the loop coils 21-1 to 21-8 of the y-direction loop coil group 20, the wires extending in the y direction do not have to be straight. It is also sufficient that the linear sections in the x direction are straight at portions where the linear sections overlap the x-direction loop coil group 10. Thus, not all of the lines need to be comprised of completely straight lines and thus may have a shape in which an end of each line is bent at one or more points.

As shown in FIG. 1, the loop coils 11-1 to 11-10 of the x-direction loop coil group 10 are arranged in the x direction so that adjacent loop coils partially overlap each other. Thus, the linear sections comprising the loop coils of the x-direction loop coil group 10 are arranged in parallel with each other at a small interval at the center portion of the x-direction loop coil group 10, and at a large interval at the edge portions of the x-direction loop coil group 10.

More specifically, for example, the linear sections of the loop coils 11-1, 11-2, and 11-3 are sequentially arranged from the left end of the left end portion (in FIG. 1) of the x-direction loop coil group 10. With regard to the three linear sections, the interval of the adjacent linear sections is greater than the interval of the adjacent linear sections at the center portion of the x-direction loop coil group 10.

Similarly, the linear sections of the loop coils 11-10, 11-9, and 11-8 are sequentially arranged from the right end of the right end portion (in FIG. 1) of the x-direction loop coil group 10. The interval of the three linear sections is greater than the interval of the adjacent linear sections at the center portion of the x-direction loop coil group 10.

The loop coils 21-1 to 21-8 of the y-direction loop coil group 20 are arranged in the y direction so that adjacent loop coils partially overlap each other. Thus, the linear sections constituting the loop coils of the y-direction loop coil group 20 are arranged in parallel with each other at a small interval at the center portion of the y-direction loop coil group 20, and at a large interval at the edge portions of the y-direction loop coil group 20.

The linear sections of the loop coils 21-1, 21-2, and 21-3 are sequentially arranged from the upper end of the upper end portion (in FIG. 1) of the y-direction loop coil group 20. With regard to the three linear sections, the interval of the adjacent linear sections is greater than the interval of the adjacent linear sections at the center portion of the y-direction loop coil group 20. The linear sections of the loop coils 21-8, 21-7, and 21-6 are sequentially arranged from the lower end of the lower end portion (in FIG. 1) of the y-direction loop coil group 20. The interval of the three linear sections is greater than the interval of the adjacent linear sections at the center portion of the y-direction loop coil group 20.

Specifically, each loop coil of the x-direction loop coil group 10 and the y-direction loop coil group 20 preferably has a width of 28.8 mm. Adjacent loop coils are displaced from each other by 6.4 mm.

A terminal portion 30 is provided between the linear sections of the loop coil 11-10 and the linear sections of the loop coil 11-9, the linear sections having a large interval.

Figure 2:
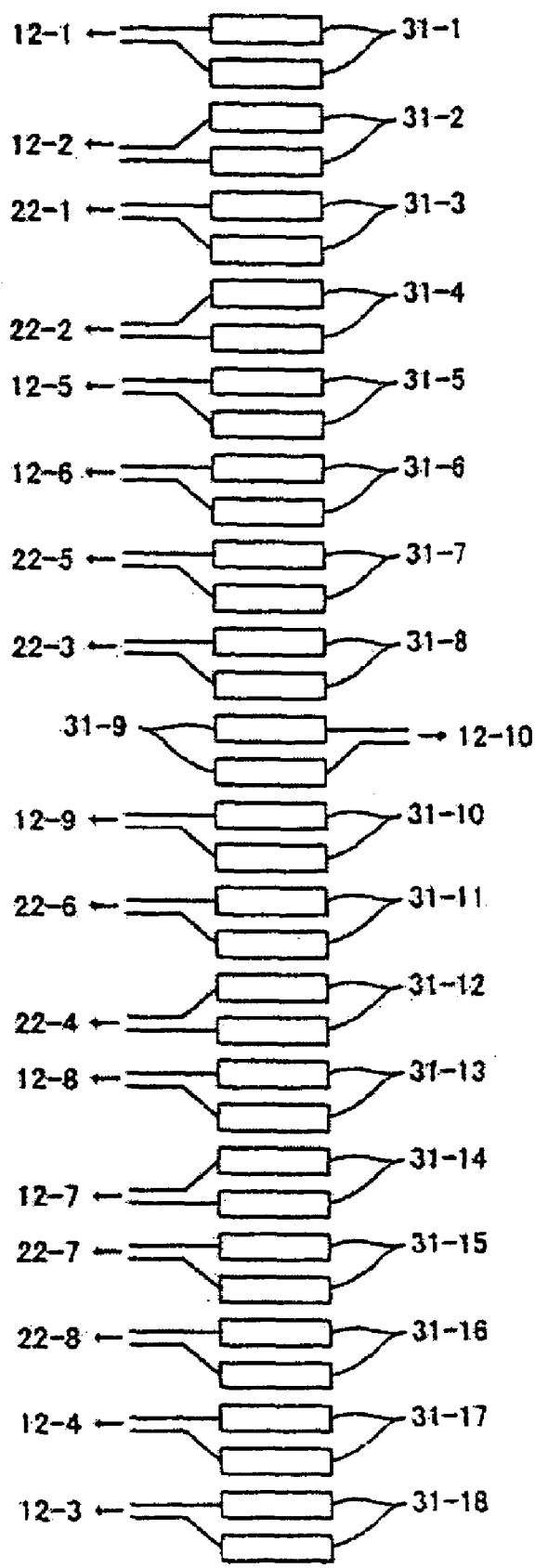
FIG. 2 is an enlarged view showing a detailed configuration of a terminal portion 30 shown in FIG. 1.

FIG. 2 is an enlarged view showing a detailed configuration of the terminal portion 30 of the sensor 1.

The terminal portion 30 has a configuration in which terminals are connected to the corresponding loop coils of the x-direction loop coil group 10 and the y-direction loop coil group 20 and are arranged along the y direction.

Two opposite ends of each loop coil of the x-direction loop coil group 10 and the y-direction loop coil group 20 are connected to the corresponding terminals of the terminal portion 30. Thus, each terminal of the terminal portion 30 can be regarded as an assembly consisting of one pair of terminals, each pair being connected to the two opposite ends of one loop coil. The number of pairs of terminals corresponds to the number of loop coils.

In the present embodiment, the terminal portion 30 has 18 terminal pairs 31-1 to 31-18 so as to correspond to the ten loop coils of the x-direction loop coil group 10 and the eight loop coils of the y-direction loop coil group 20.

Each terminal of the terminal portion 30 can be formed by partially removing a coating film that insulates a conductor provided at the surface from a pattern of the outermost layer of the sensor 1 so that the conductor is exposed. When the terminal portion 30 includes a large number of terminals, the wires of the loop coils can interfere with the terminal portion 30. In such a case, the wires that interfere with the terminal portion 30 may be formed with a pattern in a different layer.

The sensor 1 has lines 12-1 to 12-10 to connect the loop coils 11-1 to 11-10 of the x-direction loop coil group 10 with corresponding terminals of the terminal portion 30. Each of the lines 12-1 to 12-10 is constituted by two wires connected to the corresponding y-direction linear sections of the loop coils 11-1 to 11-10 and is disposed so as to run between the linear sections of the loop coils 21-1 to 21-8 of the y-direction loop coil group 20. For example, the line 12-1 connected to the loop coil 11-1 runs between one of the linear sections of the 21-1 and one of the linear sections of the loop coil 21-3 so as to extend in the x direction, and is connected to one of the terminals of the terminal portion 30.

The sensor 1 further has lines 22-1 to 22-8, which connect the loop coils 21-1 to 21-8 of the y-direction loop coil group 20 with the corresponding terminals of the terminal portion 30. Each of the lines 22-1 to 22-8 is comprised of two wires connected to the corresponding x-direction linear sections of the loop coils 21-1 to 21-8. The lines 22-1 to 22-8 extend in the y direction between the linear sections of the loop coils 11-1 to 11-10 from the x-direction linear sections of the loop coils 21-1 to 21-8 and further extend in the x direction between the linear sections of the loop coils 21-1 to 21-8. For example, the line 22-1 connected to the loop coil 21-1 extends downwardly from the liner section of the loop coil 21-1. The line 22-1 further runs between the linear section of the loop coil 21-1 and the linear section of the loop coil 21-4, and is connected to the terminal 30.

Two wires of each of the lines 12-1 to 12-10 and the lines 22-1 to 22-8 are arranged at a very small interval compared to the width of those of the loop coils 10-1 to 11-10 and the loop coil 21-1 to 21-8. Thus, when the loop coils 11-1 to 11-10 and the loop coils 21-1 to 21-8 detect electrical fields or magnetic fields, even if the lines 12-1 to 12-10 and the lines 22-1 to 22-8 are electromagnetically affected, the effect is significantly small compared to changes in electric fields or magnetic fields detected by the loop coils 11-1 to 11-10 and the loop coils 21-1 to 21-8. That is, the provision of the lines connected to the loop coils does not cause an adverse effect on the operation of the sensor 1.

Although the lines 12-1 to 12-10 and the lines 22-1 to 22-8 are illustrated as linear wires that run between the linear sections of the loop coils 11-1 to 11-10 and the linear sections of the loop coils 21-1 to 21-8, the present invention is not limited thereto. Thus, not all of the lines have to be completely straight and, for example, each line in the vicinity of the terminal portion 30 may be obliquely curved.

As shown in FIG. 2, the lines 12-1 to 12-10 connected to the loop coils 11-1 to 11-10 and the lines 22-1 to 22-8 connected to the loop coils 21-1 to 21-8 are connected to the corresponding terminal pairs 31-1 to 31-18 of the terminal portion 30.

For example, the line 12-1 is connected to the terminal pair 31-1 and the line 12-2 is connected to the terminal pair 31-2. Also, the line 22-1 is connected to the terminal pair 31-3 and the line 22-2 is connected to the terminal pair 31-4.

That is, the sensor 1 constructed as described above has the terminal portion 30, which includes the terminal pairs 31-1 to 31-18, inside the region where the loop coils 11-1 to 11-10 are arranged in the x direction and the loop coils 21-1 to 21-8 are arranged in the y direction. Further, the sensor 1 has the lines 12-1 to 12-10 and the lines 22-1 to 22-8 which connect the loop coils with the corresponding terminals 31-1 to 31-18. Thus, in the sensor 1, the lines and the terminals for supplying power and signals to the loop coils and for extracting signals from the loop coils are successively provided within the region where the loop coils are arranged.

Accordingly, a region (an invalid area) that cannot be used for detecting changes in electric fields or magnetic fields can be substantially eliminated, and the entire surface of the sensor 1 can be used as a region (a detectable area) for detecting changes in electric fields or magnetic fields.

This arrangement allows the most efficient use of the limited area of the substrate and also ensures a large detectable area while reducing the overall size of the sensor 1.

In addition, since the terminal portion 30 is disposed in a position where the adjacent linear sections are arranged at a large interval, it is possible to easily provide a terminal portion 30 having a large number of terminals. Also, since the spacing between the adjacent liner sections in the area where the terminal portion 30 is disposed is large, it is possible to easily and freely arrange the lines 12-1 to 12-10 and the lines 22-1 and 22-8.

Further, since the terminal pairs 31-1 to 31-18 of the terminal portion 30 are exposed at the surface, other wires can be easily connected to the terminal pairs 31-1 to 31-18.

Further, the terminal portion 30 and the loop coils of the x-direction loop coil group 10 and the y-direction loop coil group 20 are formed as patterns on a low-cost substrate having high rigidity. Thus, the substrate can be directly secured to a housing by screwing or by any means known in the art, unlike a case in which a flexible substrate or the like is used. This arrangement can simplify the configuration of an apparatus using the sensor 1, so that the apparatus using the sensor 1 has the advantage of a low failure rate, low cost, and high design freedom.

An example will now be described in which a control circuit board 3 has a control circuit that is connected to the terminal portion 30 of the sensor 1, as best shown in FIGS. 3 to 5.

In the example shown in FIGS. 3 to 5, the control circuit board 3 is connected to the sensor 1 via a flat cable 2.

The flat cable 2 is flexible and has conductors provided on a synthetic resin film containing polyimide or the like. Two opposite ends of the flat cable 2 have wires (not shown) for providing connections between the terminals of the terminal portion 30, and the terminals (not shown) provided at the control circuit board 3.

The control circuit board 3 has a control circuit (not shown) for supplying power and signals to the loop coils of the sensor 1 and for processing signals extracted from the loop coils.

FIG. 3 shows a structure in which the flat cable 2 is connected to the terminal portion 30 of the sensor 1 by an anisotropic conductor film (ACF) method. The flat cable 2 is further connected to and fixed to the control circuit board 3.

FIGS. 4 and 5 show a state in which the flat cable 2 of the structure shown in FIG. 3 is bent toward the reverse side of the sensor 1, i.e., toward a shield plate 13, and the control circuit board 3 is fixed to the reverse side of the sensor 1.

As shown in the side view in FIG. 4 and the plan view (showing the revere side) in FIG. 5, compared to the thickness of only the sensor 1, the thickness of one portion of the structure is increased by an amount corresponding to the thickness of the flat cable 2 and the control circuit board 3. The width of the structure shown in FIG. 4 is increased by an amount corresponding to the thickness of the flat cable 2. However, the increase in the thickness of the flat cable 2 and the control circuit board 3 is relatively small. Thus, the control circuit board 3 can be attached to the sensor 1 without a substantial increase in size.

Thus, when the control circuit board 3 is connected to the sensor 1 in a practical application, the resulting structure can be limited to a relatively compact size.

In particular, since the shield plate 13 is provided at the reverse side of the sensor 1, laminating and fixing the control circuit board 3 to the shield plate 13 can provide a compact structure. Further, connecting the flat cable 2 to the terminal portion 30 by an ACF method significantly facilitates the connection.

Although the number of loop coils of the x-direction loop coil group 10 provided at the sensor 1 is ten and the number of loop coils of the y-direction loop coil group 20 is eight in the embodiment described above, the present invention is not limited thereto. The number of loop coils may be more or less and can be changed depending on the size, application, and required detection accuracy of the sensor 1. Also, the size of the loop coils can be arbitrarily changed.

Although each of the loop coils 11-1 to 11-10 of the x-direction loop coil group 10 and the loop coils 21-1 to 21-8 of the y-direction loop coil group 20 has been described as a one-turn coil in the embodiment described above, the present invention is not limited thereto. For example, each coil may be a two-turn coil, as shown in FIG. 6. Loop coils 41 and 42 illustrated in FIG. 6 each have four linear sections and can be provided by a combination of the patterns in layers of a substrate (not shown) having a plurality of layers.

Although the configuration in which the x-direction loop coil group 10 and the y-direction loop coil group 20 are provided to detect changes in electrical fields or magnetic fields has been described in the embodiment, the present invention is not limited thereto. For example, the loop coils may be replaced with an antenna without the formation of loops. The antenna may have a comb shape, i.e., a shape in which a plurality of lines branch and extend from one line.

In this case, linear wires are arranged in the x direction in parallel with each other instead of the loop coils of the x-direction loop coil group 10, and the linear wires are arranged in parallel with each other instead of the loop coils of the y-direction loop coils group 20. Further, the terminal portion 30 is disposed between those linear wires, and the lines that provide connections between the linear wires. The corresponding terminals of the terminal portion 30 are provided so as to run between those linear wires. This arrangement provides the same advantages as the sensor 1 illustrated in the embodiment described above without the use of loop coils.

A specific example in which a comb antenna is used instead of the loop coils will now be described with reference to FIG. 7.

A sensor 5 shown in FIG. 7 uses a rigid substrate, such as a glass epoxy substrate, as in the sensor 1. The sensor 5 has an x-direction signal detection line group 60 and a y-direction signal detection line group 70.

The x-direction signal detection line group 60 has a configuration in which five signal detection lines 62-1 to 62-5 extending in the y direction are connected to a base line 61 extending in the x direction. Portions inside the five signal detection lines 62-1 to 62-5 provide detectable areas where the x-direction signal detection line group 60 can detect signals. The y-direction signal detection line group 70 has a configuration in which five signal detection lines 72-1 to 72-5 extending in the x direction are connected to a base line 71 extending in the y direction. Portions inside the five signal detection lines 72-1 to 72-5 provide detectable areas where the y-direction signal detection line group 70 can detect signals.

The sensor 5 has a terminal portion 80 within the detectable area. The terminal portion 80 includes ten terminals connected with the corresponding signal detection lines 62-1 to 62-5 and the signal detection lines 72-1 to 72-5. The terminals of the terminal portion 80 are exposed at a surface of the sensor 5, as in the terminal pairs of the terminal portion 30.

The sensor 5 has lines 63-1 to 63-5 that provide connections between the detection lines 62-1 to 62-5 of the x-direction signal detection line group 60 and the corresponding terminals of the terminal portion 80. The sensor 5 further has lines 73-1 to 73-5 that provide connections between the detection lines 72-1 to 72-5 of the y-direction signal detection line group 70 and the corresponding terminals of the terminal portion 80. All of the lines 63-1 to 63-5 and 73-1 to 73-5 are arranged in the detectable areas defined by the x-direction signal detection line group 60 and the y-direction signal detection line group 70.

The sensor 5 shown in FIG. 7 has various advantages as in the sensor 1 of the embodiment described above. That is, the lines and the terminals for supplying power and signals to the signal detection lines 62-1 to 62-5 and 72-1 to 72-5 and for extracting signals from the signal detection lines are successively provided within the region where the signal detection lines are arranged. Thus, a region (an invalid area) that cannot be used for detecting changes in electric fields or magnetic fields can be substantially eliminated, and the entire surface of the sensor 5 can be used as a detectable area for detecting changes in electric fields or magnetic fields. This arrangement allows the most efficient use of the limited area of the substrate and also can ensure a large detectable area while reducing the overall size of the sensor 5.

Since the terminals of the terminal portion 80 are exposed at the surface, connecting the flat cable 2 (shown in FIG. 3) with the terminals allows easy connection of, for example, an external substrate, such as the control circuit board 3 (FIG. 3).

Further, since the sensor 5 is constructed using a low-cost rigid substrate having high rigidity in the same manner as the sensor 1, the substrate 5 can be directly secured to a housing or the like by screwing or by any means known in the art. As a result, the configuration of a device using the sensor 5 can be simplified, which makes it possible to provide a low-cost device that has a low failure rate and has high design freedom.

The x-direction signal detection line group 60 in which the signal detection lines 62-1 to 62-5 are connected to one base line 61 is used in the exemplary configuration shown in FIG. 7. A plurality of x-direction signal line groups can also be arranged at the sensor 5. That is, a second base line other than the base line 61 and x-direction signal line detection groups, each group being comprised of at least one signal detection line connected to the second base line, can be arranged side by side with the x-direction signal detection line group 60. The same thing can be true for the y-direction signal detection line group 70. That is, a second base line other than the base line 71 and y-direction signal line detection groups, each group being comprised of at least one signal detection line connected to the second base line, can be arranged at the sensor 5 so as to provide a configuration in which a plurality of y-direction signal detection line groups are arranged. In such a case, patterns at the sensor 5 can also be used so that a terminal portion and lines that connect the terminal portion and the corresponding signal detection lines are provided within the region where the signal detection lines are arranged.

In addition, in the embodiment described above, positions for arranging the individual lines, a sequence for connecting the lines to the corresponding terminals, and so on can be arbitrarily changed. Other detailed configurations can also be changed as required without departing from the spirit and scope of the present invention.

In combination with a position indicator such as a cursor or an input pen (including an air brush type) having a built-in coil, the sensor for a coordinate input device according to the present invention can be used as a coordinate input device for detecting a position indicated by the position indicator. The sensor may take the form of a table in which the structure of a control circuit substrate is connected to the sensor and the resulting structure is accommodated in one housing. The sensor may also take the form of an input device in which the sensor and a liquid crystal display device are accommodated in the same housing so as to allow for instruction operation on a displayed screen.

We claim:

1. A sensor for a coordinate input device, the sensor comprising:

an x-direction signal detection line group including a plurality of signal detection lines arranged in an x direction, each signal detection line having a linear section perpendicular to the x direction;

a y-direction signal detection line group including a plurality of signal detection lines arranged in a y direction, each signal detection line having a linear section perpendicular to the y direction; and a terminal portion including a plurality of terminals between adjacent ones of the linear sections of the x-direction signal detection line group or the y-direction signal detection line group;

wherein the linear sections of the signal line detection lines of the x-direction signal detection group and the linear sections of the signal detection lines of the y-direction signal detection line group are provided by patterns in different layers, and lines are disposed between the linear sections of the signal detection lines of the x-direction signal detection line group or the linear sections of the signal detection lines of the y-direction signal detection line group to provide connections between the terminals of the terminal portion and the corresponding signal detection lines of the x-direction signal detection line group and the y-direction signal detection line group.

2. A sensor for a coordinate input device, the sensor comprising:

an x-direction loop coil group including a plurality of loop coils arranged in an x direction, each loop coil having at least two linear sections perpendicular to the x direction;

a y-direction loop coil group including a plurality of loop coils arranged in a y direction, each loop coil having at least two linear sections perpendicular to the y direction; and a terminal portion including a plurality of terminals between adjacent ones of the linear sections of the x-direction loop coil group or the y-direction loop coil group;

wherein the linear sections of the loop coils of the x-direction loop coil group and the linear sections of the loop coils of the y-direction loop coil group are provided by patterns in different layers, and lines are disposed between the linear sections of the loop coils of the x-direction loop coil group or the linear sections of the loop coils of the y-direction loop coil group to provide connections between the terminals of the terminal portion and the corresponding loop coils of the x-direction loop coil group and the y-direction loop coil group.

3. The sensor according to claim 2, wherein adjacent ones of the loop coils of the x-direction loop coil group and the y-direction loop coil group are arranged so as to partially overlap each other.

4. The sensor according to claim 3, wherein the terminal portion is disposed between the linear sections of two adjacent ones of the loop coils of the x-direction loop coil group at an edge portion of the x-direction loop coil group or in the vicinity of the edge portion or between the linear sections of two adjacent ones of the loop coils of the y-direction loop coil group at an edge portion of the y-direction loop coil group or in the vicinity of the edge portion.

5. The sensor according to claim 2, wherein the terminal portion comprises a plurality of terminals exposed at a surface of the sensor and a shield plate is disposed at a reverse side of the surface at which the plurality of terminals are exposed.

6. The sensor according to claim 2, wherein a flexible cable having wires for sending signals to the loop coils of the x-direction loop coil group and the y-direction loop coil group and for extracting signals from the loop coils is connected to the terminals of the terminal portion by an anisotropic conductive film method.

7. The sensor according to claim 2, wherein the terminal portion and the loop coils of the x-direction loop coil group and the y-direction loop coil group are formed as patterns on a rigid substrate.

8. A method of assembling a sensor for a coordinate input device, comprising the steps of:

providing on a substrate an x-direction loop coil group including a plurality of loop coils arranged in an x direction, each loop coil having at least two linear sections perpendicular to the x direction;

providing on the substrate a y-direction loop coil group including a plurality of loop coils arranged in a y direction, each loop coil having at least two linear sections perpendicular to the y direction; and providing on the substrate a terminal portion including a plurality of terminals between adjacent ones of the linear sections of the x-direction loop coil group or the y-direction loop coil group;

patterning linear sections of the loop coils of the x-direction loop coil group and the linear sections of the loop coils of the y-direction loop coil group in different layers, and interposing lines between the linear sections of the loop coils of the x-direction loop coil group or the linear sections of the loop coils of the y-direction loop coil group to provide connections between the terminals of the terminal portion and the corresponding loop coils of the x-direction loop coil group and the y-direction loop coil group.

9. A method of fabricating sensor for a coordinate input device, comprising the steps of:

positioning on a substrate an x-direction signal detection line group including a plurality of signal detection lines arranged in an x direction, each signal detection line having a linear section perpendicular to the x direction;

positioning on the substrate a y-direction signal detection line group including a plurality of signal detection lines arranged in a y direction, each signal detection line having a linear section perpendicular to the y direction; and providing a terminal portion including a plurality of terminals between adjacent ones of the linear sections of the x-direction signal detection line group or the y-direction signal detection line group;

patterning linear sections of the signal line detection lines of the x-direction signal detection group and the linear sections of the signal detection lines of the y-direction signal detection line group in different layers, and interposing lines between the linear sections of the signal detection lines of the x-direction signal detection line group or the linear sections of the signal detection lines of the y-direction signal detection line group to provide connections between the terminals of the terminal portion and the corresponding signal detection lines of the x-direction signal detection line group and the y-direction signal detection line group.

* * * * *